May 23, 1961 K. G. ÅHLÉN 2,985,034
DRIVING UNITS FOR VEHICLES OR THE LIKE
Filed Dec. 14, 1954 4 Sheets-Sheet 3
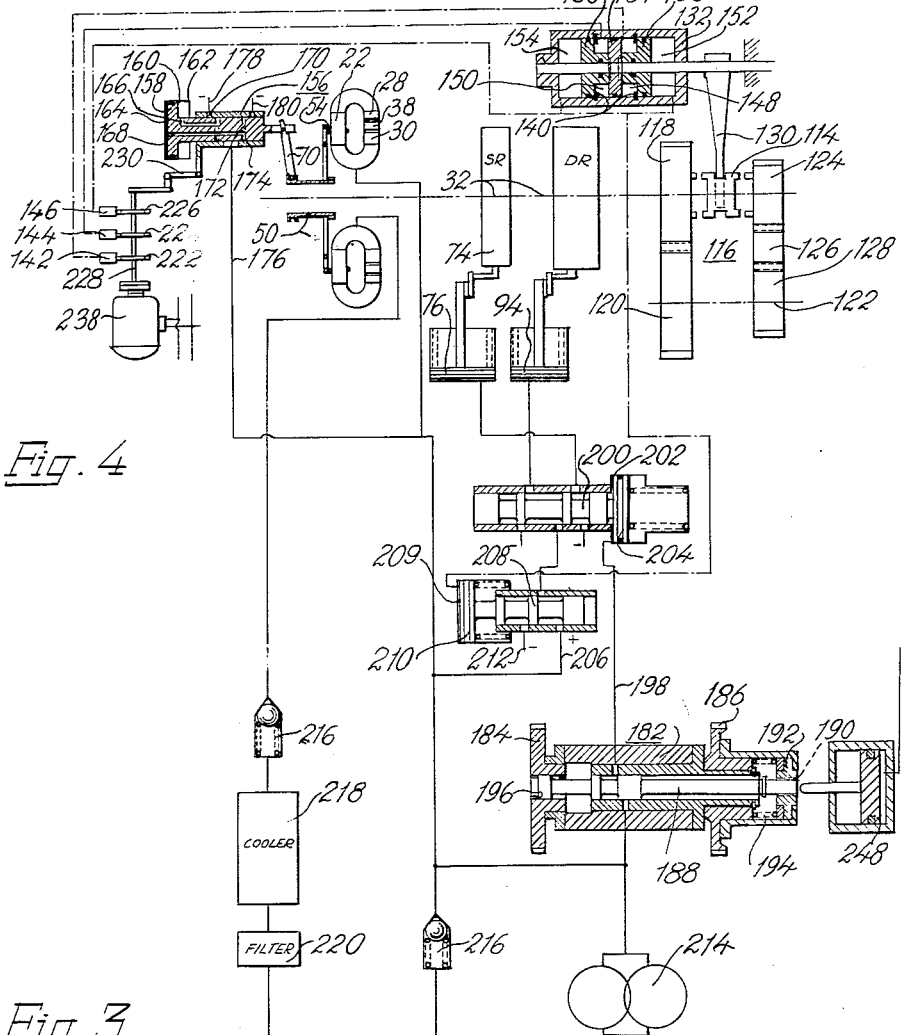
Fig. 4
Fig. 3
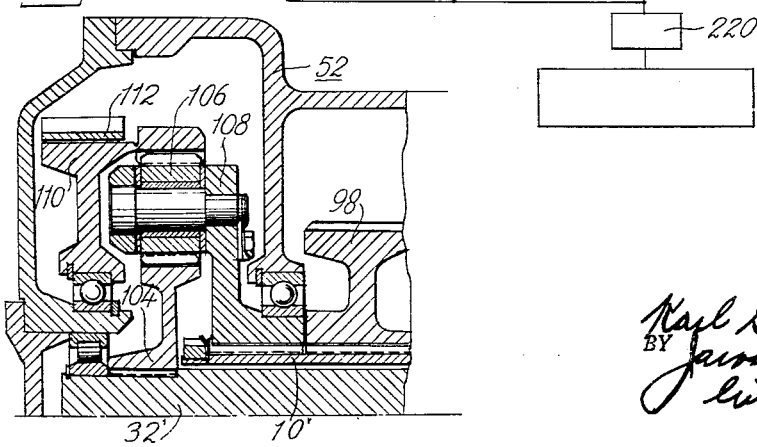
INVENTOR.
Karl Gustav Åhlén
BY Jarvis C. Marble
his attorney

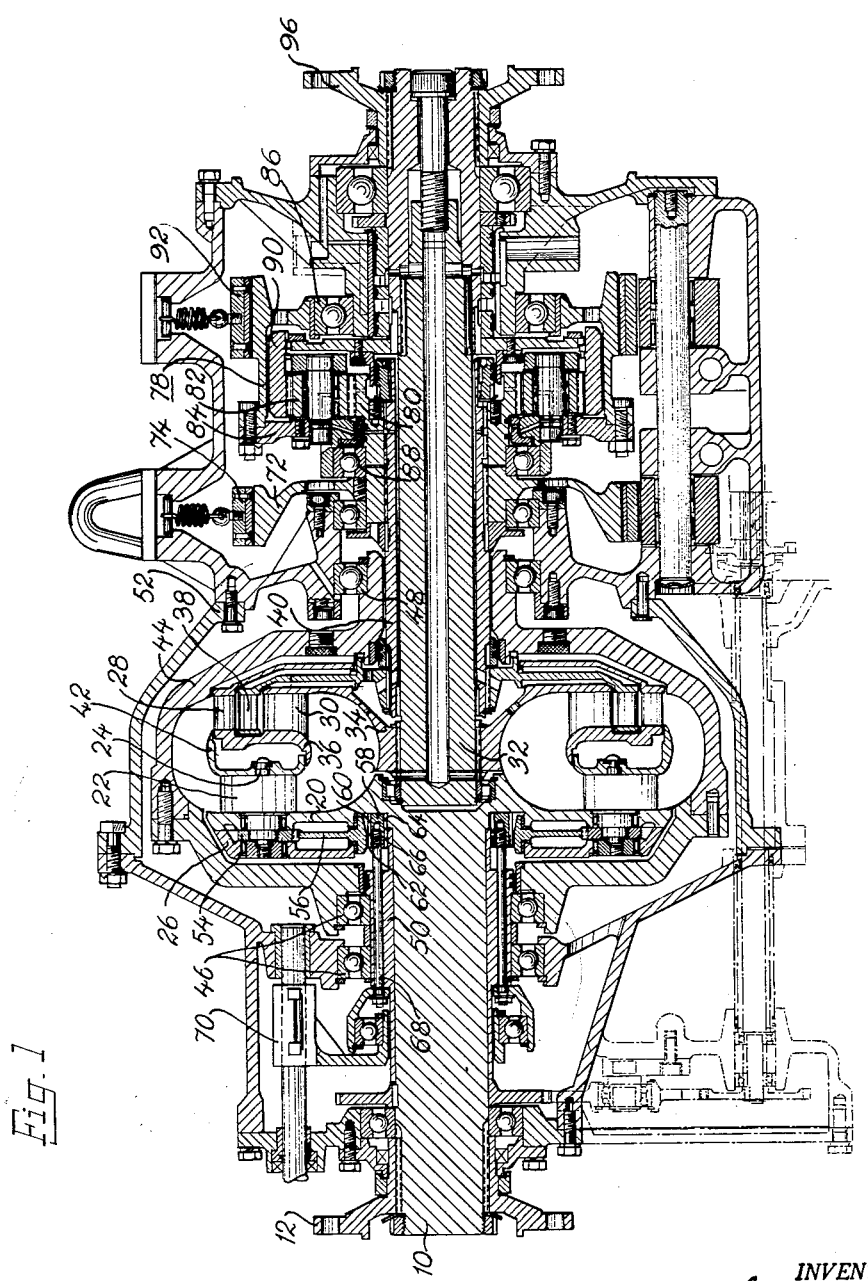

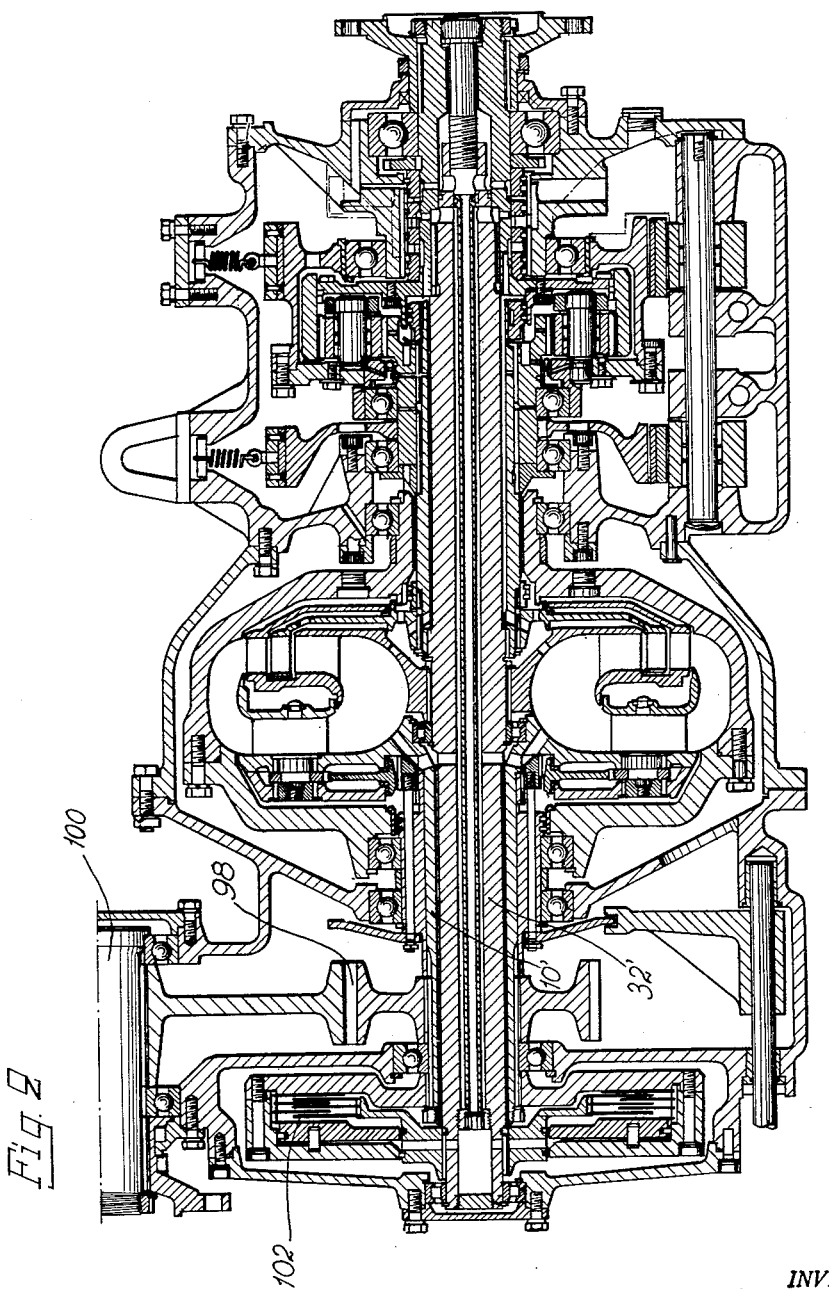

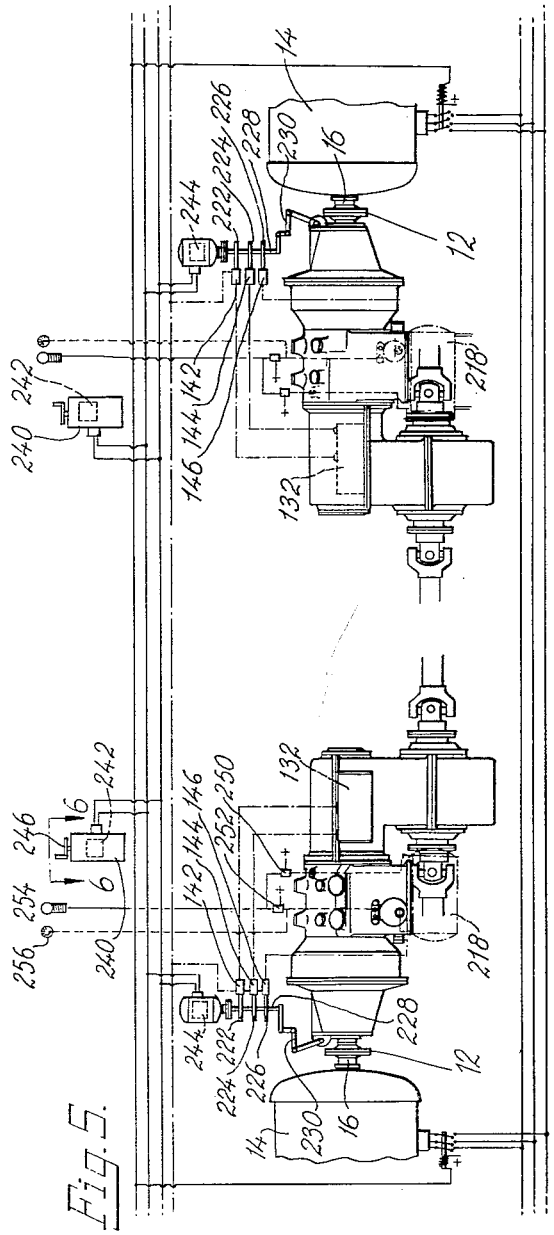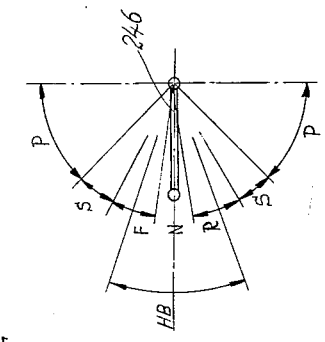

United States Patent Office 2,985,034
Patented May 23, 1961

2,985,034
DRIVING UNITS FOR VEHICLES OR THE LIKE

Karl Gustav Åhlén, Stockholm, Sweden, assignor to Svenska Rotor Maskiner Aktiebolag, Nacka, Sweden, a corporation of Sweden Filed Dec. 14, 1954, Ser. No. 475,263

Claims priority, application Sweden Dec. 15, 1953

19 Claims. (Cl. 74—645)

This invention relates to a driving unit consisting of an electric constant speed motor and a hydraulic torque converter and to a multi-motor system having a plurality of such driving units.

The invention will be described with reference to the conditions existing in electric railway service although it is not confined to this application but may also be employed for other purposes for which speed and torque regulation should be located on the mechanical side of the driving unit having for its primary power generator an electric constant-speed motor.

For electric railway service an alternating current drive is preferable from many points of view, but the high motor output and heavy current produce considerable difficulties with respect to the design of the regulating devices. In order to switch over the circuits of the motors, relay-operated switches and contacts are required wherein the relay circuits are connected to the controller contacts. In multi-motor locomotives and motor coaches having group driving of the motors such installations become complicated and expensive.

The object of the invention is to simplify the power transmission in these and similar cases by employing driving units consisting of an electric constant-speed motor and a hydraulic torque converter.

According to the present invention the driving unit is provided with means to control the torque converter so as to regulate the power delivered by the unit.

Preferably the torque of the torque converter is regulated automatically and/or manually, and in a preferred construction the torque converter is provided with angularly adjustable pump impeller blading and with guide vanes disconnectable by a planetary gear.

The invention will be hereinafter more particularly described with reference to the embodiments thereof shown by way of example in the accompanying drawings, in which:

Fig. 1 shows in longitudinal section a hydraulic torque converter constructed according to the invention.

Fig. 2 shows a similar view of a further hydraulic torque converter provided with a direct-acting clutch and a primary gear.

Fig. 3 shows a change gear of the torque converter described with reference to Fig. 2.

Fig. 4 is a diagrammatic view of an operating system regulated by a pressure medium for changing over between different driving functions of the torque converter.

Fig. 5 is a schematic view of a combined system comprising a plurality of driving units having a torque converter constructed according to the invention and employed for the group-driving of multimotor railway locomotives of motor coaches; and Fig. 6 is a schematic view of a scale showing the different connecting positions for the controller 240.

Referring to Fig. 1 the torque converter has a primary shaft 10 adapted to be connected by means of a coupling disc 12 to the driving shaft 16 (Fig. 5) of an electric constant-speed motor 14. The primary shaft 10 is formed with a flange 20 on which a number of pump impellers 22 are mounted in a ring. The pump impellers 22 are carried by stub shafts 24 supported in the flange 20 and in an annular casing 26 secured to the flange 20, the casing 26 and the flange 20 forming a housing for an adjusting device for the pump impellers 22.

The turbine section of the torque converter consists of two rings of turbine blades 28 and 30 of which the second ring of blades 30 is directly supported on the secondary shaft 32 of the torque converter by means of a circular disc 34 fixed to shaft 32. The first ring of turbine blades 28 is supported by the second ring 30 through the intermediary of an annular disc 36 forming a part of the core of the hydraulic circuit. Between the two rings of turbine blades 28, 30 is interposed a ring of guide vanes 38 supported by a hollow shaft 40 concentrically surrounding the secondary shaft 32. The other part of the core of the hydraulic circuit is formed by an annular disc 42 into which the ends of the shafts 24 are threaded.

The outer wall of the hydraulic circuit is defined in part by a freely rotatable housing 44 supported by axially spaced ball-bearings 46 and 48, respectively, and also in part by the annular discs 20, 34. The ball-bearing 46 is mounted on a sleeve 50 mounted to rotate with the primary shaft 10 and the ball-bearing 48 is mounted on a stationary casing 52 of the torque converter.

To produce angular adjustment of the pump impellers 22, gear segments 54 are rotated by means of a gear wheel 56 in threaded connection with an axially displaceable ring 58 having an external helically cut gear 60 with which the gear wheel engages by means of guide bosses 62. The ring 58 can slide along the sleeve 50 and is formed on its inner face with straight teeth 64 engaging with guide bosses 66 on the sleeve. Axial displacement of the ring 58 is effected by rods 68 mounted in the sleeve 50, and having their inner ends secured to the ring 58, and their outer ends connected to a control lever 70 mounted on the stationary casing.

On the shaft 40 carrying the guide vane section 38 is secured a disc 72 surrounded by a brake band 74 which is tightened by means of a piston 76 operated by a pressure medium (Fig. 4), thereby locking the guide vane section against rotation. Instead of the band brake, a friction clutch may, for example, be provided for the same purpose.

The guide vane section 38 can rotate in both directions and may be connected to the shaft 32 of the turbine sections 28, 30 by an interconnectable planetary gear 78 for transmitting power alternatively in one direction or the other between the shaft 40 of the guide vane section and the shaft 32 of the turbine section. In the example illustrated the planetary gear consists of a sun wheel 80 fixed to the shaft 40 of the guide vane section and cooperating with a planet wheel 82 mounted on a planet wheel carrier 84 supported by ball-bearings 86 and 88 on the sunwheel 80 and on the stationary casing 52 respectively. The shaft 32 of the turbine section carries a disc 90 having internal teeth in engagement with the planet wheel 82. The planet wheel carrier 84 can be locked by a suitable device which in the form illustrated consists of a brake band 92 surrounding the carrier 84 and which can be drawn by a pressure-operated piston 94 (Fig. 4). Power is taken from the shaft 32 of the turbine section, that is the secondary shaft, through a flange coupling 96.

By means of the planetary gear the guide vane section of the torque converter can be used as a counterrotating turbine for supplying power, this function being utilized within that part of the speed range where the secondary shaft runs at a low speed. Instead of taking power from the secondary shaft it may be taken alternatively from a separate output shaft.

In the alternative construction of torque converter shown in Fig. 2 the secondary shaft comprising the shaft 32' of the turbine section is extended to the front of the torque converter and the primary shaft comprising the pump impeller shaft 10' is hollow and is arranged concentrically around the turbine shaft 32'. The shaft 10' is driven by a primary gear 98 mounted on a shaft 100 passing inwardly from the driving motor. Between the shafts 10' and 32' of the pump and turbine sections a hydraulically operated friction clutch 102 is arranged to provide direct drive between the primary and secondary shafts when engaged.

In the construction shown in Fig. 3 the primary gear 98 of the impeller shaft 10' is combined with a change-speed gear inserted between the primary and secondary shafts 10' and 32'. Said gear consists of a sun wheel 104 mounted on the turbine shaft 32', a number of planet wheels 106 supported by a planet wheel carrier 108 mounted on the pump shaft 10' and a ring 110 provided with internal teeth and supported on the casing 52 and adapted to be locked by means of an adjustable brake band 112 for coupling the change speed gear.

In the arrangement shown in Fig. 4 a coupling sleeve 114 is mounted on the turbine shaft 32 and forms part of a reversing gear 116 for changing over between forward and backward running. On moving the coupling sleeve 114 into engagement with a gear wheel 118 on the left, forward drive is obtained at the output shaft 122 through a gear wheel 120 cooperating with the gear 118. By moving the coupling sleeve 114 into engagement with a gear-wheel 124 on the right the direction of rotation is reversed by means of the intermediate gear 126 and the gear 128 so that reverse drive is obtained at the output shaft 122.

For actuating the reversing gear 116 the coupling sleeve is provided with a control arm 130 displaceable by a compressed air-operated piston mechanism 132. This consists of a central piston 134 operating the control arm 130 and laterally located pistons 136, 138 on each side of the central piston 134 with inner limiting positions determined by stop-rings 140. The mechanism also includes valves 142, 144 and 146 for regulating the supply of the pressure medium alternatively to one or the other of the chambers 148, 150 intermediate the central piston 134 and the lateral piston 136 or 138, respectively, or as a further alternative, to the pressure chambers 152, 154 on the outer sides of the lateral pistons. With the first and second alternatives, coupling is established for forward running and backward running, respectively, and in the third alternative the reversing gear is in the neutral position.

To adjust the pump impellers 22 the torque converter is provided with a pressure oil operated piston mechanism 156 consisting of a piston 158 within a casing 160 with compression chambers 162 and 164, respectively, in front of and behind the piston, flow channels 166 and 168 in the piston rod leading from the said compression chambers to the discharge holes 170 and 172 in the piston rod and a slide valve 174 displaceable along the piston rod with admission and discharge pipes 176, 178 and 180 for the pressure medium. The latter are so arranged in the case illustrated that when the pump impellers are closed, the front compression chamber 162 is filled and the rear chamber 164 is empty, and that for opening the pump impellers 22 by the displacement of the slide valve 174 the back compression chamber 164 is filled and the front chamber 162 is empty. The amount by which the pump impellers 22 are opened is determined by the extent of displacement of the slide valve 174 and therefore by the entraining of the piston 158. By this means the pump impellers can be made continuously adjustable within at least a part of the regulating range. The pump impellers are preferably so constructed that in closed position they completely close the hydraulic circuit of the torque converter.

The torque converter further includes a regulator 182 dependent upon the speed ratio between the turbine and pump for coupling in and out the power transmitted by the guide vane section 38 to the turbine shaft and for locking the guide vanes against rotation. The regulator 182 consists of two coaxially arranged main members 184, 186 driven by the pump and turbine shafts, respectively, either directly or through gearing. Between the main members 184, 186 a slide valve 188 is disposed in threaded connection 190 with a member 192 in turn in frictional connection 194 with the main member 186. The slide valve 188 is connected by a key connection with the other main member 184. Owing to the limited screwing movement imparted by the slide valve 188 in one direction or the other, depending upon whether the member 186 is rotating faster or slower than the member 184, the slide valve 188 opens or closes a pipe 198. This supplies pressure medium to adjust a multi-way valve 200 for feeding either the locking device 76 for the guide vane section 38 or the locking device 94 for the planetary gear 78 of said section with the pressure medium with simultaneous emptying of the other locking device.

In the position shown the regulating valve 188 is moved to its left-hand limiting position in which the pipe 198 is cut off and therefore no pressure medium is supplied to the pressure chamber 202 in front of the pressure piston 204 in the main valve. The main valve 200 is also in its left-hand limiting position as the pressure piston 94 for the brake band 92 to the planetary gear of the guide vane is fed with pressure medium while at the same time the compression chamber for the piston 76 of the guide vane brake is emptied through the main valve. When the regulating valve 188 is moved to its right-hand limiting position the compression chamber 202 is fed with pressure medium and the piston 204 moves the main valve to its right-hand limiting position in which the compression chamber of the pressure piston 94 for the planetary gear brake of the guide vanes is emptied and the compression chamber for the pressure piston 76 of the guide vanes is fed with pressure medium through the main valve 200.

An auxiliary valve 208 of the slide valve type is inserted in a connecting pipe 206 for conveying pressure medium from a source of pressure medium to the locking device of the guide vane through the main valve 200. When the reversing gear 116 is in its neutral position valve 208 cuts off the said connection pipe so that the locking devices are released. This auxiliary valve 208 is controlled by pressure medium passing through the same valve 146 which controls the coupling of the reversing gear 156 in the neutral position, and in Fig. 4 the auxiliary valve is shown in its left-hand limiting position where it opens the connecting pipe 206. On supplying compressed air to a compression chamber 209 behind a pressure piston 210 of the auxiliary valve 208, the auxiliary valve is moved to the right so that it closes the connecting pipe 206 and opens a discharge pipe 212.

In the hydraulic regulating system a regulating member dependent upon the speed may also be included for automatically changing over the coupling from hydraulic drive to direct drive.

Pressure medium in the form of pressure oil or the like is supplied by a pump 214 to the hydraulic circuit of the torque converter and to the adjusting device for the pump impellers and to the devices for locking the guide vane section and the planetary gear of the latter respectively. The piping system includes suitable members 216, 218, 220 in the form of return valves, coolers and filters.

To adjust the valves 142, 144, 146 for regulating the supply of compressed air to the pressure piston mechanism of the auxiliary valve 208 and of the reversing gear 116 a number of cams 222, 224, 226 are provided which are rotated together by a rotating shaft 228. By means of a link mechanism 230 the same rotating shaft 228 adjusts the slide valve 174 which controls the adjustment of the pump impellers. The devices for adjusting the pump impellers and for coupling the guide vane section are so arranged that the guide vane section can be uncoupled while at the same time the pump impellers are closed for the purpose of interrupting the power line in one direction or another. The change-over coupling for the reversing gear is designed to cooperate with the devices for adjusting the pump impellers and for coupling the planetary gear of the guide vane section, in such a way that the pump impellers are closed and the planetary gear is connected on the coupling of the reversing gear.

The actuating members for the valves 142, 144, 146, 174 may form part of a valve regulator 238 for programme control which is motor-driven, the motor of the valve regulator being adjusted by means of a controller 240. The controller and valve regulating motor may be interconnected by a selsyn installation consisting of a synchronous generator 242 and a synchronous motor 244. A multi-motor vehicle or other motor-driven system may include a number of driving units according to the invention which may be constructed in such a way that any of the controllers can be connected up as a master controller for the whole system.

If desired, the system may be provided with a single valve regulator for adjusting all the driving units in common.

Fig. 6 is a schematic view of a scale showing the different connecting positions for the controller 240. In an intermediate position N of the operating lever 246 the reversing gear is in a neutral position. On each side thereof connecting sections F and R are provided in which the coupling of the reversing gear in the position for running forwardly or backwardly takes place. Within the sections denoted by R, N and F the pump impellers are closed and therefore the hydraulic circuit of the torque converter is closed. The intervals S and P correspond to a first and second resistance step for opening the pump impellers and therefore the withdrawal of the torque from the torque converter so that in the interval S the guide vane section rotates in a counter-direction through its planetary gear, and the interval P the guide vane section is locked by its braking device. The position for changing the coupling between these two intervals is determined automatically by the regulator 182 which is dependent upon the speed and is designed to change over the coupling at a suitable speed ratio determined by the appearance of the efficiency curves for the torque converter in the respective coupling positions of the guide vane section and the modification of these curves caused by the amount of opening of the pump impellers. On acceleration, the operating lever is moved to the transition point between the intervals S and P, and when the acceleration has increased sufficiently for the changing of the coupling to be completed, further connection takes place in the interval P in which the amount of opening of the pump impellers regulates the quantity of power taken out more or less continuously.

When hydraulic braking is employed, it can take place by coupling the locking device of the guide vane section in the interval P down to the interval S, whereupon the braking effect increases inasmuch as the pump impellers gradually braking may be carried out by causing the guide vane section to rotate in the opposite direction by coupling its planetary gear.

In order to utilize this means of braking, a pressure medium-regulated piston 248 is indicated by way of suggestion in the diagram, Fig. 4, which when the valve 188 is in its right-hand limiting position corresponding to hydraulic braking by locking the guide vanes, moves the valve 188 to its left-hand limiting position corresponding to the coupling of the guide vane section as a counter-rotating turbine by means of its planetary gear.

Within the outer halves of the intervals R and F the guide vane section is preferably adapted to rotate freely. The controller should be fitted with an automatic device for blocking the reversing gear in its forward or backward position which prevents movement into the interval HB when the vehicle is running.

In order to check that the temperature of the oil system is not too high or that the pressure is not too low suitable indicators 250 and 252 are provided which are connected to a signal lamp 254. A manometer 256 indicates the pressure.

For obtaining effective synchronization of the turbine when coupling up the reversing gear, the compression chamber 209 for the pressure piston 210 of the auxiliary valve 208 may be fed from a separate cam-controlled valve on the rotating shaft 228 in place of the valve 146 which moves the reversing gear into neutral position. In the neutral position of the reversing gear the auxiliary valve 208 will be in its left-hand limiting postion so that the pressure piston 94 of the planetary is supplied with pressure medium. The turbine is braked by the counter-rotation of the guide vane section so that the coupling of the reversing gear is synchronized. In the diagram, Fig. 4, the left-hand limiting position of the auxiliary valve corresponds to the interval HP for the operating lever and the right-hand outer half of the inerval F or R respectively.

In my application Serial No. 475,248, filed December 14, 1954, now Patent No. 2,935,898, granted May 10, 1960, there is disclosed and claimed a particular type of hydraulic transmission or torque converter and in the instant application there is disclosed and claimed such hydraulic transmission or torque converter in combination with an electrical power plant for driving the same, together with the necessary controls. In this combination, the drive means comprises a prime mover provided by a constant speed electric motor.

What I claim is:

1. A driving unit comprising an electric constant speed motor and a hydrodynamic torque converter comprising within a housing a primary member driven by said motor and having pump blades carried thereby, a turbine member having turbine blades carried thereby, a reaction member having reaction blades carried thereby, said housing providing a hydraulic circuit for said blades and means for regulation of the output torque from the motor comprising means for adjustment of the angular position of the pump blades.

2. A driving unit as defined in claim 1 in which gearing is provided for engagement of the reaction member with the turbine member.

3. A driving unit as defined in claim 1 in which the housing is freely rotating relative to said members.

4. A driving unit as defined in claim 1 in which said means for angular adjustment of the blades is synchronously rotating with the member carrying said blades.

5. A driving unit as defined in claim 1 in which said means for angular adjustment of the blades is operated to adjust the flow cross section of the hydraulic circuit to a complete closing of the same.

6. A driving unit as defined in claim 2 including a non-rotatable member and means for engaging the reaction member and said non-rotatable member.

7. A driving unit as defined in claim 6 which includes a regulator controlling the speed ratio between the turbine and pump members for selectively connecting the reaction member with the turbine member and connecting the reaction member and said non-rotatable member.

8. A driving unit as defined in claim 6 in which said means for angular adjustment of the blades is operable to adjust the flow cross section of the hydraulic circuit to a complete closing of the same, the gearing for the reaction member with the turbine member and the means for engaging the reaction member with said non-rotatable member being arranged to simultaneously disengage the reaction member when the means for adjusting the adjustable blades closes the hydraulic circuit.

9. A driving unit as defined in claim 1 which includes a reverse gear having forward, backward and neutral positions, a gearing provided for engagement of the reaction member with a turbine member and said means for angular adjustment of the blades being operable to adjust the flow cross section of the hydraulic circuit to a complete closing of the same, said gearing being arranged to engage the reaction member with the turbine member and said means for adjustment of the blades being arranged to close the hydraulic circuit while actuating the reversing gear.

10. A driving unit as defined in claim 9 which includes means operated by a pressure medium for adjusting the adjustable blades, for engaging the reaction member to a non-rotatable member and for shifting the reversing gear.

11. A driving unit as defined in claim 10 which includes a valve regulated by the speed ratio between the turbine and pump members, said valve actuating a multi-way valve for supplying pressure medium alternatively to the means for engaging the reaction member to a non-rotatable member or for influencing means for engaging the gearing between the reaction and turbine members.

12. A driving unit as defined in claim 11 which includes a pressure operated auxiliary valve in a conduit between a source of pressure medium and a multi-way valve for closing said conduit for releasing the means for engaging the reaction member to a non-rotatable member while the reversing gear is in its neutral position.

13. A driving unit as defined in claim 12 which includes means operated by a pressure medium for shifting the reversing gear, said means comprising a casing, a central piston connected with means for engaging the reversing gear with return pistons, a return piston being disposed on each side of the central piston and valves for supplying the pressure medium selectively to one or the other spaces between the central piston and the return piston or simultaneously to both spaces outside the return pistons.

14. A driving unit as defined in claim 13 provided with a piston mechanism operated by a pressure medium for adjusting the adjustable blades and comprising a piston, channels in the piston leading from said pressure chambers to apertures in the piston and a slide valve displaceable in relation to the piston and having admission and discharge conduits for the pressure medium so arranged that when the hydraulic circuit is closed one pressure chamber is filled and the other is empty and that for opening of the hydraulic circuit by displacement of the slide valve, pressure medium is admitted to the other pressure chamber and discharged from the first one so that the extent by which the hydraulic circuit is opened is determined by the extent of the displacement of the slide valve.

15. A driving unit as defined in claim 14 which includes a valve regulator for controlling a number of valves supplying pressure medium to the auxiliary valve, to the piston mechanism of the reversing gear and to the slide valve of said mechanism for adjusting the adjustable blades.

16. A motor driven system having a plurality of driving units as defined in claim 15.

17. A multimotor system as defined in claim 16 in which each of the driving units is provided with a motor driven valve regulator and a controller for controlling the motor of the valve regulator.

18. A multimotor system as defined in claim 17 in which in each unit the controller and valve regulator are interconnected by a selsyn installation.

19. A multimotor system as defined in claim 18 in which any one of the controllers may serve as a master controller for the system.

References Cited in the file of this patent
UNITED STATES PATENTS

| | | |
|---|---|---|
| 1,900,120 | Lysholm et al. | Mar. 7, 1933 |
| 1,985,017 | Bush | Dec. 18, 1934 |
| 2,746,583 | Blevins | May 22, 1956 |
| 2,935,898 | Ahlen | May 10, 1960 |